(12) United States Patent
Chung et al.

(10) Patent No.: US 10,283,920 B2
(45) Date of Patent: May 7, 2019

(54) INTERFACE DEVICE

(71) Applicant: Samsung Electronics Co., Ltd., Gyeonggi-do (KR)

(72) Inventors: Il-Hyung Chung, Gyeonggi-do (KR); Cheol-Ho Lee, Gyeonggi-do (KR); Cheol-Yoon Chung, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/818,206

(22) Filed: Nov. 20, 2017

(65) Prior Publication Data

US 2018/0145469 A1 May 24, 2018

(30) Foreign Application Priority Data

Nov. 18, 2016 (KR) .................. 10-2016-0154199

(51) Int. Cl.
| | |
|---|---|
| *H01R 31/02* | (2006.01) |
| *H01R 13/703* | (2006.01) |
| *H01R 24/62* | (2011.01) |
| *H01R 31/06* | (2006.01) |
| *H04M 1/02* | (2006.01) |
| *H01R 24/58* | (2011.01) |
| *H01R 105/00* | (2006.01) |
| *H01R 107/00* | (2006.01) |
| *H01R 24/60* | (2011.01) |
| *H02J 7/00* | (2006.01) |

(52) U.S. Cl.
CPC ......... *H01R 31/02* (2013.01); *H01R 13/7039* (2013.01); *H01R 24/62* (2013.01); *H01R 31/065* (2013.01); *H04M 1/02* (2013.01); *H01R 24/58* (2013.01); *H01R 24/60* (2013.01); *H01R 2105/00* (2013.01); *H01R 2107/00* (2013.01); *H02J 2007/0062* (2013.01)

(58) Field of Classification Search
CPC ...... H01R 31/02; H01R 13/709; H01R 24/62; H01R 31/065
USPC ........................................... 439/502
See application file for complete search history.

(56) References Cited

U.S. PATENT DOCUMENTS

| | | | |
|---|---|---|---|
| 6,203,344 B1 * | 3/2001 | Ito .......................... | H01R 27/00 439/218 |
| 7,697,697 B2 * | 4/2010 | Su ........................... | H04R 5/04 381/123 |
| 7,699,664 B2 * | 4/2010 | Kim ....................... | H01R 24/58 381/374 |

(Continued)

FOREIGN PATENT DOCUMENTS

KR     10-0791583     1/2008

OTHER PUBLICATIONS

International Search Report dated Feb. 23, 2018 issued in counterpart application No. PCT/KR2017/013138, 9 pages.

*Primary Examiner* — Alexander Gilman
(74) *Attorney, Agent, or Firm* — The Farrell Law Firm, P.C.

(57) ABSTRACT

Disclosed is an interface device capable of simultaneously connecting an audio device and charger to an electronic device. An interface device may enable an electronic device with a single USB type-C connector but no analog audio jack to connect to both an audio device and a charger through the USB type-C connector. The interface device may provide automated quick charging when connected with the charger but not with the audio device.

7 Claims, 15 Drawing Sheets

(56) References Cited

U.S. PATENT DOCUMENTS

| | | | |
|---|---|---|---|
| 7,744,428 B2* | 6/2010 | Chung | H01R 31/06 |
| | | | 439/668 |
| 7,803,016 B2* | 9/2010 | Neu | H04R 5/00 |
| | | | 439/527 |
| 9,558,144 B2* | 1/2017 | Nge | G06F 13/382 |
| 9,559,905 B2* | 1/2017 | Chen | H04L 41/0816 |
| 9,583,975 B2* | 2/2017 | Talmola | H02J 7/0072 |
| 9,652,351 B2* | 5/2017 | Srivastava | G06F 11/3051 |
| 9,715,472 B2* | 7/2017 | Chang | G06F 13/4022 |
| 9,871,524 B2* | 1/2018 | Kim | H03K 19/018592 |
| 9,904,267 B2* | 2/2018 | Tupala | G05B 19/0428 |
| 9,916,272 B2* | 3/2018 | Nge | G06F 13/385 |
| 9,948,094 B1* | 4/2018 | Sheng | H02J 1/00 |
| 9,949,047 B2* | 4/2018 | Ryu | H04R 29/001 |
| 2007/0229122 A1* | 10/2007 | Kiyozaki | G06F 1/3203 |
| | | | 327/108 |
| 2008/0236866 A1* | 10/2008 | Kim | H01R 24/58 |
| | | | 174/113 R |
| 2013/0331035 A1 | 12/2013 | Wu | |
| 2014/0055928 A1 | 2/2014 | Lee | |
| 2015/0229161 A1 | 8/2015 | Talmola et al. | |
| 2015/0261714 A1 | 9/2015 | Talmola | |
| 2016/0062935 A1 | 3/2016 | Talmola | |

\* cited by examiner

| STATE OF CONNECTION | SW1 | SW2 | SW3 | SW4 | TA(CC1, CC2) | Phone(CC1, CC2) | STATE OF OPERATION |
|---|---|---|---|---|---|---|---|
| TA CONNECT-X, 3.5pi-X Phone CONNECT-O | OFF | OFF | OFF | OFF | CC1-open, CC2-open | CC1-open, CC2-open | NOT OPERATED |
| TA CONNECT-X, 3.5pi-O Phone CONNECT-O | ON | ON | OFF | OFF | CC1-open, CC2-open | CC1-Ra(1K OR LESS), CC2-Ra(1K OR LESS) | ANALOG AUDIO |
| TA CONNECT-O, 3.5pi-O Phone CONNECT-O | ON | ON | X | ON | CC1-open, CC2-Rd(5.1k) | CC1-Ra(1K OR LESS), CC2-Ra(1K OR LESS) | ANALOG AUDIO 500mA CHARGED |
| TA CONNECT-O, 3.5pi-X Phone CONNECT-O | OFF | OFF | ON | OFF | CC1-open, CC2-connect | CC1-open, CC2-connect | QUICK CHARGING |

FIG. 10

INTERFACE DEVICE

PRIORITY

This application claims priority under 35 U.S.C. § 119(a) to a Korean Patent Application filed in the Korean Intellectual Property Office on Nov. 18, 2016 and assigned Serial No. 10-2016-0154199, the contents of which are incorporated herein by reference.

BACKGROUND

1. Field of Disclosure

The present disclosure relates generally to an electronic device, and more particularly, to an interface device supplying a charging voltage to an electronic device.

2. Description of Related Art

MP3 players, portable multimedia players (PMPs), tablet PCs, the Galaxy Tab, smartphones, the iPad, and e-book terminals are among electronic devices now available. Such electronic devices are portable and allow their users to enjoy a diversity of media content while being carried in hand. These electronic devices may be connected with various external devices through interface devices, connectors or adapters, and provide expanded functionality through connections to the external devices.

An electronic device may come with an analog audio connector such as a 3.5pi analog audio jack, to provide connection with an external audio device. The electronic device may output sound through the external audio device when connected with an external audio device. The electronic device may also include a universal serial bus (USB) connector, a USB plug, or a receptacle that allows the electronic device to connect with an external electronic device such as a computer, charger, memory, or electric fan, to communicate power or data with the external electronic device.

The user of an electronic device with both an analog audio connector and a USB connector may charge the electronic device with power from other electronic devices through the USB connector while listening to music through an audio device connected through the analog audio connector.

USB type-C connectors have recently been developed and adopted for electronic devices. A USB type-C connector may be a USB type-C connector plug or a USB type-C connector receptacle which is capable of supporting digital audio. Thus, an electronic device may be connected with an external audio device via its USB type-C connector and output sound through the external audio device.

Increasing demand exists for development of electronic devices equipped with a USB type-C connector instead of an analog audio connector. Where an electronic device comes with one USB type-C connector without a 3.5 pi analog audio jack, the user may connect to either an audio device or a charger but not to both using the USB type-C connector. Thus, the user cannot charge the electronic device while listening to music.

SUMMARY

In accordance with an aspect of the present disclosure, provided is an interface device allowing an electronic device with a single USB type-C connector to connect to both an audio device and a charger through the USB type-C connector.

In accordance with an aspect of the present disclosure, provided is an interface device allowing an electronic device with a single USB type-C connector to connect to both an audio device and a charger through the USB type-C connector, and if connected with the charger but not with the audio device, then enabling quick charging.

According to an aspect of the present disclosure, an interface device includes a first plug of a first universal serial bus (USB) type, a first receptacle of the first USB type, an analog audio jack, and a connection circuit configured to connect the first plug to at least one of the first receptacle and the analog audio jack and to supply a quick charging voltage from a power supply to an electronic device when the power supply is connected to the first receptacle, and no plug is connected to the analog audio jack while the first plug is connected with the electronic device.

BRIEF DESCRIPTION OF THE DRAWINGS

The above and other aspects, features, and advantages of the present disclosure will be more apparent from the following detailed description when taken in conjunction with the accompanying drawings, in which:

FIG. 10 is a table illustrating a switching operation of an adapter, according to an embodiment of the present disclosure;

DETAILED DESCRIPTION

Figure 1:
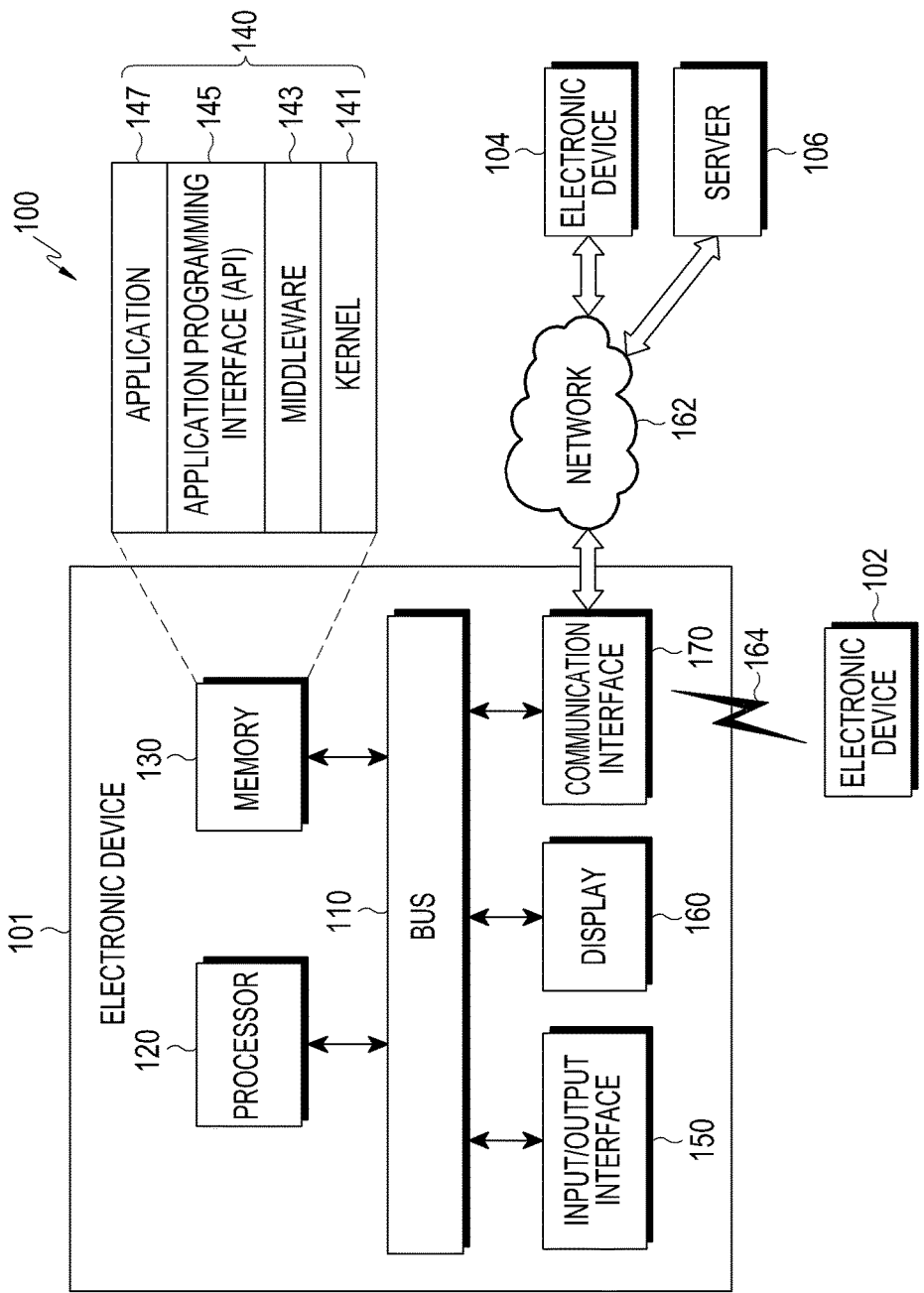
FIG. 1 is a block diagram of a network environment including an electronic device, according to an embodiment of the present disclosure.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish one component from another component without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the expression "configured to" may be interchangeably used with other expressions, such as "suitable for," "capable of," "modified to," "made to," "adapted to," "able to," or "designed to" in hardware or software in the context. The expression "configured to" may mean that a device can perform an operation together with another device or parts. For example, the expression "processor configured (or set) to perform A, B, and C" may mean a generic-purpose processor (e.g., a central processing unit (CPU) or application processor (AP)) that may perform the operations by executing one or more software programs stored in a memory device or a dedicated processor (e.g., an embedded processor) for performing the operations.

Examples of an electronic device, according to embodiments of the present disclosure, may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device. Examples of the smart home appliance may include at least one of a television, a digital versatile disc (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™, PlayStation™), an electronic dictionary, an electronic key, a camcorder, or an electronic picture frame.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller machines (ATMs), point of sales (POS) devices, or Internet of Things (IoT) devices (e.g., a light bulb, various sensors, a sprinkler, a fire alarm, a thermostat, a street light, a toaster, fitness equipment, a hot water tank, a heater, or a boiler).

According to various embodiments of the disclosure, examples of the electronic device may be at least one of part of a piece of furniture, building/structure or vehicle, an electronic board, an electronic signature receiving device, a projector, or various measurement devices (e.g., devices for measuring water, electricity, gas, or electromagnetic waves). The electronic device may be flexible or may be a combination of the above-described electronic devices. The electronic devices are not limited to those described above. As used herein, the term "user" may denote a human or another device (e.g., an artificial intelligence electronic device) using the electronic device.

Referring to FIG. 1, an electronic device 100 is included in a network environment 101. The electronic device 101 includes a bus 110, a processor 120, a memory 130, an input/output interface 150, a display 160, and a communication interface 170. The electronic device 101 may exclude at least one of the components or may add another component. The bus 110 may include a circuit for connecting the components 110 to 170 with one another and transferring communications (e.g., control messages or data) between the components. The processing module 120 may include one or more of a CPU, an AP, or a communication processor (CP). The processor 120 may perform control on at least one of the other components of the electronic device 101, and/or perform an operation or data processing relating to communication.

The memory 130 may include a volatile and/or non-volatile memory. The memory 130 may store commands or data related to other components of the electronic device 101. According to an embodiment of the present disclosure, the memory 130 may store software and/or a program 140. The program 140 may include a kernel 141, middleware 143, an application programming interface (API) 145, and/or an application program (or "application") 147. At least a portion of the kernel 141, middleware 143, or API 145 may be referred to as an operating system (OS). For example, the kernel 141 may control or manage system resources such as the bus 110, processor 120, or a memory 130, used to perform operations or functions implemented in other programs including the middleware 143, API 145, or application program 147. The kernel 141 may provide an interface that allows the middleware 143, the API 145, or the application program 147 to access the individual components of the electronic device 101 to control or manage the system resources.

The middleware 143 may function as a relay to allow the API 145 or the application program 147 to communicate data with the kernel 141. Further, the middleware 143 may process one or more task requests received from the application program 147 in order of priority. The middleware 143 may assign a priority of using system resources such as the bus 110, processor 120, or memory 130, of the electronic device 101 to at least one of the application programs 147 and process one or more task requests. The API 145 is an interface that allows the application 147 to control functions provided from the kernel 141 or the middleware 143. For example, the API 133 may include at least one interface, function, or command, for filing control, window control, image processing or text control. The input/output interface 150 may transfer commands or data input from the user or other external device to other component(s) of the electronic device 101 or may output commands or data received from other component(s) of the electronic device 101 to the user or other external devices.

The display 160 may include a liquid crystal display (LCD), a light emitting diode (LED) display, an organic light emitting diode (OLED) display, a microelectromechanical systems (MEMS) display, or an electronic paper display. The display 160 may display text, images, videos, icons, or symbols) to the user. The display 160 may include a touchscreen and may receive a touch, a gesture, an input according to proximity or a hovering input using an electronic pen or a body portion of the user. The communication interface 170 may set up communication between the electronic device 101 and an external electronic device (e.g., a first electronic device 102, a second electronic device 104, or a server 106). For example, the communication interface 170 may be connected with a network 162 through wireless or wired communication and may communicate with an external device (e.g., the second external electronic device 104 or server 106).

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM). The wireless communication may include at least one of wireless fidelity (Wi-Fi), bluetooth, bluetooth low energy (BLE), zigbee, near field communication (NFC), magnetic secure transmission (MST), radio frequency, or body area network (BAN). The wireless communication may include global navigation satellite system (GNSS). The GNSS may be a global positioning system (GPS), global navigation satellite system (Glonass), Beidou navigation satellite system (Beidou), or Galileo, the European global satellite-based navigation system. Hereinafter, the term "GPS" can be used interchangeably with the term "GNSS". The wired connection may include at least one of a universal serial bus (USB), a high definition multimedia interface (HDMI), recommended standard (RS)-232, a power line communication (PLC), or a plain old telephone service (POTS). The network 162 may include at least one of a telecommunication network, a computer network (e.g., local area network (LAN) or wide area network (WAN)), Internet, or a telephone network.

The first and second external electronic devices 102 and 104 each may be a device of the same type or a different type from that of the electronic device 101. All or some of the operations executed on the electronic device 101 may be executed on the electronic devices 102 and 104 and/or server 106. When the electronic device 101 should perform some function or service automatically or upon a request, the electronic device 101, instead of executing the function or service on its own or additionally, may request another device (e.g., electronic devices 102 and 104 and/or server 106) to perform at least some functions associated therewith. The other electronic device may execute the requested functions or additional functions and transfer a result of the execution to the electronic device 101. The electronic device 101 may provide a requested function or service by processing the received result as it is or using a cloud computing, distributed computing, or client-server computing technique.

Figure 2:
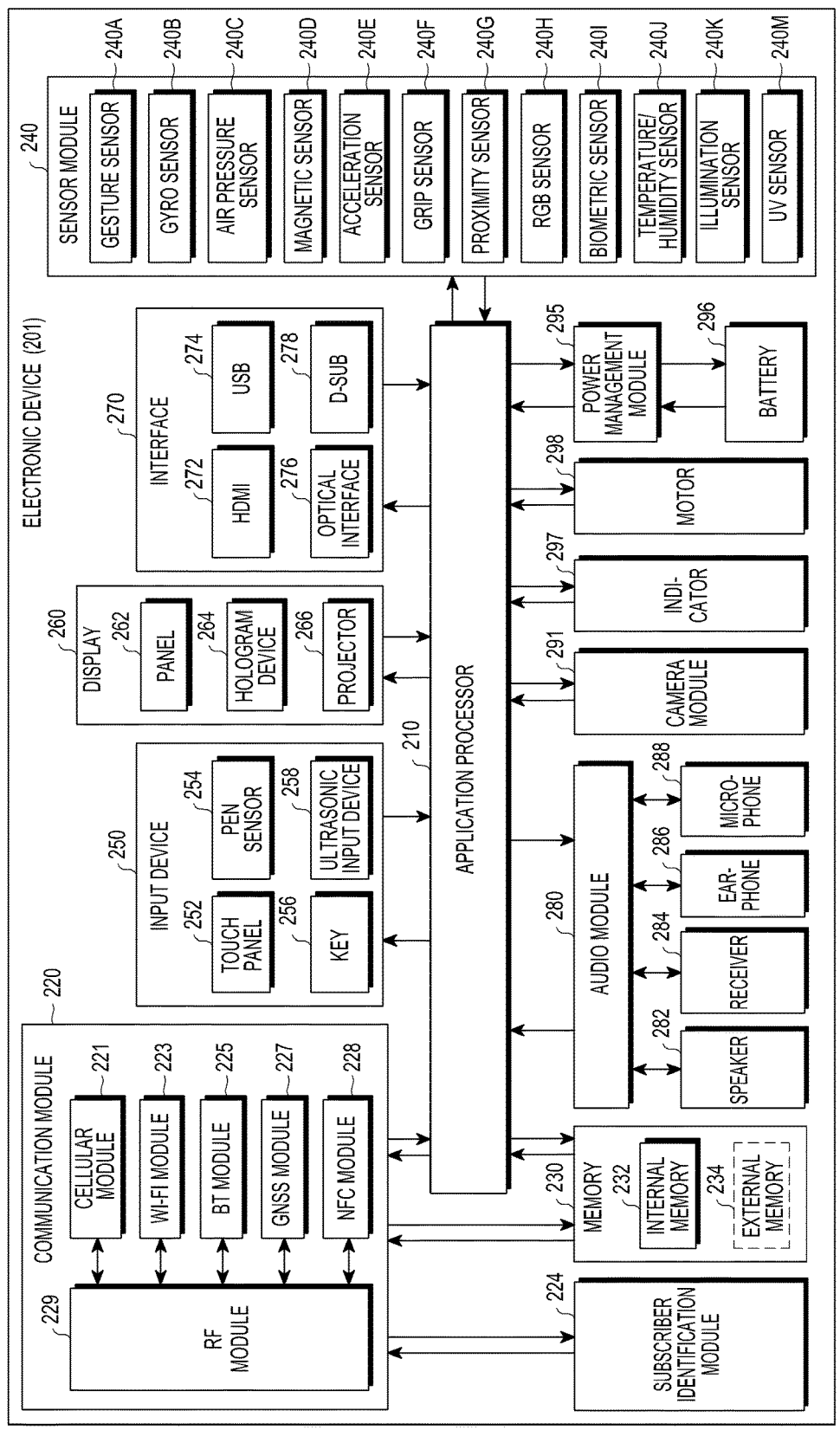
FIG. 2 is a block diagram of an electronic device, according to an embodiment of the present disclosure.

FIG. 2 is a block diagram of an electronic device, according to an embodiment of the present disclosure.

The electronic device 201 may include one or more processors (e.g., APs) 210, a communication module 220, a subscriber identification module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may control multiple hardware and software components connected to the processor 210 by running an operating system or application programs, and the processor 210 may process and compute various data. The processor 210 may be implemented in a system on chip (SoC). According to an embodiment of the present disclosure, the processor 210 may further include a graphic processing unit (GPU) and/or an image signal processor. The processor 210 may include at least some (e.g., a cellular module 221) of the components shown in FIG. 2. The processor 210 may load a command or data received from at least one of the other components (e.g., a non-volatile memory) on a volatile memory, process the command or data, and store resultant data in the non-volatile memory.

The communication module 220 may include a cellular module 221, a wireless fidelity (Wi-Fi) module 223, a bluetooth (BT) module 225, a GNSS module 227, a NFC module 228, and a RF module 229. The cellular module 221 may provide voice call, video call, text, or Internet services through the communication network. The cellular module 221 may perform identification or authentication on the electronic device 201 in the communication network using a SIM 224 by using the SIM card.

The cellular module 221 may perform at least some of the functions providable by the processor 210. The cellular module 221 may include a CP. At least some of the cellular module 221, the Wi-Fi module 223, the Bluetooth module 225, the GNSS module 227, or the NFC module 228 may be included in a single integrated circuit (IC) or an IC package. The RF module 229 may communicate data and communication signals (e.g., RF signals). The RF module 229 may include a transceiver, a power amp module (PAM), a frequency filter, a low noise amplifier (LNA), or an antenna. According to an embodiment of the present disclosure, at least one of the cellular module 221, the Wi-Fi module 223, the Bluetooth module 225, the GNSS module 227, or the NFC module 228 may communicate RF signals through a separate RF module. The SIM 224 may include a card having a subscriber identification module, or an embedded SIM, and may contain unique identification information, an integrated circuit card identifier (ICCID), or subscriber information such as an international mobile subscriber identity (IMSI).

The memory 230 and the memory 130 may include an internal memory 232 or an external memory 234. The internal memory 232 may include at least one of a volatile memory (e.g., a dynamic RAM (DRAM), a static RAM (SRAM), a synchronous dynamic RAM (SDRAM)) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory 234 may include a flash drive, a compact flash (CF) memory, a secure digital (SD) memory, a micro-SD memory, a min-SD memory, an extreme digital (xD) memory, a multi-media card (MMC), or a memory stick™. The external memory 234 may be functionally or physically connected with the electronic device 201 via various interfaces.

The sensor module 240 may measure a physical quantity or detect an operational state of the electronic device 201, and the sensor module 240 may convert the measured or detected information into an electrical signal. The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H, such as a red-green-blue (RGB) sensor, a bio sensor 240I, a temperature/humidity sensor 240J, an illumination sensor 240K, or an ultra violet (UV) sensor 240M. The sensing module 240 may include an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. The electronic device 201 may further include a processor configured to control the sensor module 240 as part of the processor 210 or separately from the processor 210, and the electronic device 2701 may control the sensor module 240 while the processor 210 is in a sleep mode.

The input unit 250 may include a touch panel 252, a digital pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include a part of a touch panel or a separate sheet for recognition. The key 256 may include a physical button, optical key or key pad. The ultrasonic input device 258 may sense an ultrasonic wave generated from an input tool through a microphone 288 to identify data corresponding to the sensed ultrasonic wave.

The display 260 or the display 160 may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present disclosure, the panel 262 may include a pressure sensor that may measure the strength of a pressure by a user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201. The interface 270 may include a high definition multimedia interface (HDMI) 272, a USB 274, an optical interface 276, or a D-subminiature (D-sub) 278. The interface 270 may be included in the communication interface 170 shown in FIG. 1. The interface 270 may include a mobile high-definition link (MHL) interface, a secure digital (SD) card interface, a multimedia card (MMC) interface, or Infrared Data Association (IrDA) standard interface.

The audio module 280 may convert a sound signal into an electrical signal and vice versa. At least a part of the audio module 280 may be included in the input/output interface 145 as shown in FIG. 1. The audio module 280 may process sound information input or output through a speaker 282, a receiver 284, an earphone 286, or the microphone 288.

The camera module 291 may be a device for capturing still images and videos, and may include, according to an embodiment of the present disclosure, one or more front and back image sensors, a lens, an image signal processor (ISP), or a flash such as an LED or xenon lamp.

The power manager module 295 may manage power of the electronic device 201 and may include a power management Integrated circuit (PMIC), a charger IC, or a battery gauge. The PMIC may have a wired and/or wireless recharging scheme. The wireless charging scheme may include a magnetic resonance scheme, a magnetic induction scheme, or an electromagnetic wave based scheme, and an additional circuit, such as a coil loop, a resonance circuit, a rectifier, for wireless charging. The battery gauge may measure an amount of remaining power of the battery 296, a voltage, a current, or a temperature while the battery 296 is being charged. The battery 296 may include a rechargeable battery or a solar battery.

The indicator 297 may indicate a particular state of the electronic device 201 or the processor 210 of the electronic device, including a booting state, a message state, or recharging state. The motor 298 may convert an electric signal to a mechanical vibration and may generate a vibrational or a haptic effect. The electronic device 201 may include a mobile TV supporting device (e.g., a GPU) that may process media data as per digital multimedia broadcasting (DMB), digital video broadcasting (DVB), or mediaFlo™ standards. Each of the aforementioned components of the electronic device 201 may include one or more parts, and a name of the part may vary with a type of electronic device. The electronic device 201 may exclude or include some elements, or some of the elements may be combined into a single entity that may perform the same function as by the elements before they were combined.

Figure 3:
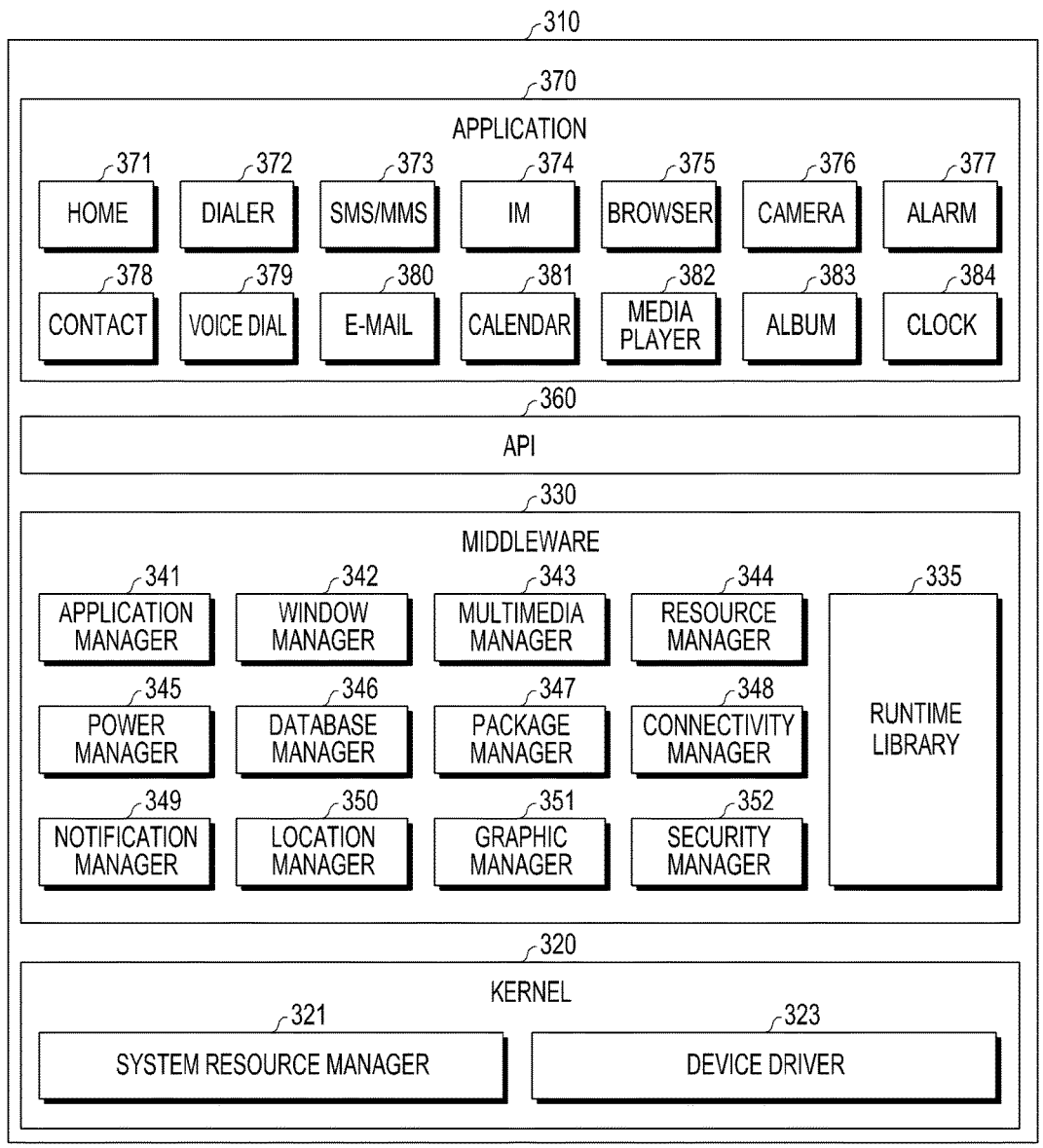
FIG. 3 is a block diagram of a program module, according to an embodiment of the present disclosure.

FIG. 3 is a block diagram of a program module, according to an embodiment of the present disclosure.

Referring to FIG. 3, a program module 310 of the electronic device 101 is provided. The program module 310 and/or the program 140 may include an OS controlling resources related to the electronic device 101 and/or the AP 217 driven on the OS. The OS may include, e.g., Android™, iOS™, Windows™, Symbian™, Tizen™, or Bada™. The program module 310 may include a kernel 320 middleware 330, an API 360, and/or an application 370. At least a part of the program module 310 may be preloaded on the electronic device or may be downloaded from an external electronic device such as the electronic devices 102 and 104 or server 106.

The kernel 320 may include a system resource manager 321 or a device driver 323. The system resource manager 321 may perform control, allocation, or recovery of system resources. The system resource manager 321 may include a process managing unit, a memory managing unit, or a file system managing unit. The device driver 323 may include a display driver, a camera driver, a bluetooth driver, a shared memory driver, a USB driver, a keypad driver, a Wi-Fi driver, an audio driver, or an inter-process communication (IPC) driver.

The middleware 330 may provide various functions to the application 370 through the API 360 so that the application 370 may use limited system resources in the electronic device 101 or provide functions jointly required by the application 370. The middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while the application 370 is being executed. The runtime library 335 may perform input/output management, memory management, or arithmetic function processing. The application manager 341 may manage the life cycle of the applications 370. The window manager 342 may manage GUI resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage the battery capability or power, and provide power information necessary for the operation of the electronic device. The power manager 345 may interwork with a basic input/output system (BIOS). The database manager 346 may generate, search, or vary a database to be used in the applications 370. The package manager 347 may manage an installation or update of an application that is distributed in the form of a package file.

The connectivity manager 348 may manage wireless connectivity. The notification manager 349 may provide an event, e.g., arrival message, appointment, or proximity alert, to the user. The location manager 350 may manage locational information on the electronic device. The graphic manager 351 may manage graphic effects to be offered to the user and their related user interface. The security manager 352 may provide system security or user authentication. The middleware 330 may include a telephony manager for managing the voice or video call function of the electronic device or a middleware module able to form a combination of the functions of the above-described elements. The middleware 330 may provide a module specified according to the type of operating system. The middleware 330 may dynamically omit some existing components or add new components. The API 360 may be a set of API programming functions and may have different configurations depending on operating systems. For example, in the case of Android™ or iOS™, one API set may be provided per platform, and in the case of Tizen™, two or more API sets may be offered per platform.

The application 370 may include a home application 371, a dialer application 372, an SMS/MMS application 373, an instant message (IM) application 374, a browser application 375, a camera application 376, an alarm application 377, a contact application 378, a voice dial application 379, an email application 380, a calendar application 381, a media player application 382, an album application 383, or a clock application 384. The application 370 may additionally include a health-care application for measuring the degree of workout or blood sugar, or an environmental information application for measuring air pressure, moisture, or temperature. The application 370 may include an information exchanging application supporting information exchange between the electronic device 101 and an external electronic device. The information exchange application may include a notification relay application for transferring specific information to the external electronic device, or a device management application for managing the external electronic device. The notification relay application may transfer notification information generated by other applications of the electronic device to the external electronic device, or the notification relay application may receive notification information from the external electronic device and provide the received notification information to the user. The device management application may install, delete, or update a function (e.g., turn-on/turn-off the external electronic device (or some elements) or adjusting the brightness (or resolution) of the display) of the external electronic device communicating with the electronic device 101, or an application operating on the external electronic device. The application 370 may include an application (e.g., a health-care application of a mobile medical device) designated according to an attribute of the external electronic device. According to an embodiment of the present disclosure, the application 370 may include an application received from the external electronic device. At least a portion of the program module 310 may be implemented (e.g., executed) in software, firmware, hardware, or a combination thereof, and may include a module, program, routine, command set, or process for performing one or more functions.

An electronic device may be connected with various external electronic devices to provide expanded functionality through connection with the external electronic devices. Specifically, the electronic device may be connected with an external audio device through an interface device such as a connector or adapter, to output sound to the external audio device or may be connected with another external electronic device such as a computer, charger, memory, or electric fan, to communicate power or data with the other external electronic device.

An interface device may be an electronic device providing interfacing functionality and may include a connector or adapter.

The interface device includes a first plug of a first universal serial bus (USB) type, a first receptacle of the first USB type, an analog audio jack, and a connection circuit configured to connect the first plug to at least one of the first receptacle and the analog audio jack and to supply a quick charging voltage from a power supply to an electronic device when the power supply is connected to the first receptacle, and no plug is connected to the analog audio jack while the first plug is connected with the electronic device.

The first USB type may be a USB type-C. The first plug of the USB type-C may include a first CC pin and a first VCONN pin, the first receptacle of the USB type-C includes a second CC pin and a second VCONN pin, and the analog audio jack includes a DET1 terminal. The connection circuit may include at least one or more switches for connecting the first CC pin and the first VCONN pin to the DET1 terminal, connecting any one of the second CC pin and the second VCONN pin to a pull-down resistor, or connecting the first VCONN pin to the second VCONN pin.

The at least one or more switches may include a first switch connected between a CC1 line connected with the first CC pin of the first plug and the DET1 terminal of the analog audio jack to switch on or off. A second switch may be connected between a CC2 line connected with the first VCONN pin of the first plug and the DET1 terminal of the analog audio jack to switch on or off. A third switch may be connected between the CC2 line connected with the first VCONN pin of the first plug and the CC2 line connected with the second VCONN pin or between the CC1 line connected with the first CC pin of the first plug and the CC1 line connected with the second CC pin of the first receptacle to switch on or off. A fourth switch may be connected between the CC2 line connected with the second VCONN pin of the first receptacle and the pull-down resistor or between the CC1 line connected with the second CC pin of the first receptacle and the pull-down resistor to switch on or off.

When the first plug is connected to a first electronic device, the first receptacle is in a non-connected state, and an audio device is connected to the analog audio jack, the third switch and the fourth switch may be switched off, and the first switch and the second switch may be switched on to electrically connect the first electronic device to the analog audio jack.

When the first plug is connected to a first electronic device, a charger is connected to the first receptacle, and an audio device is connected to the analog audio jack, the third switch and the fourth switch may be switched off, and the first switch and the second switch may be switched on to electrically connect the first electronic device to the analog audio jack and to electrically connect the first electronic device to the charger.

When the first plug is connected to a first electronic device, a charger is connected to the first receptacle, and the analog audio jack is in a non-connected state, the third switch may be switched on, and the first switch, the second switch, and the fourth switch may be switched off to electrically connect the first electronic device to the charger.

The interface device may further include a first housing including the first plug of the first USB type, a second housing including the first receptacle of the first USB type and the analog audio jack, and a cable connecting the first housing with the second housing.

The interface device may further include a third plug of the first USB type connected with the first receptacle and a power plug connected with the third plug to deliver power from an external power source to the third plug when the power plug is connected to the external power source.

The interface device may further include a third plug of the first USB type connected with the first receptacle and a battery pack to provide power to the third plug.

Figure 4:
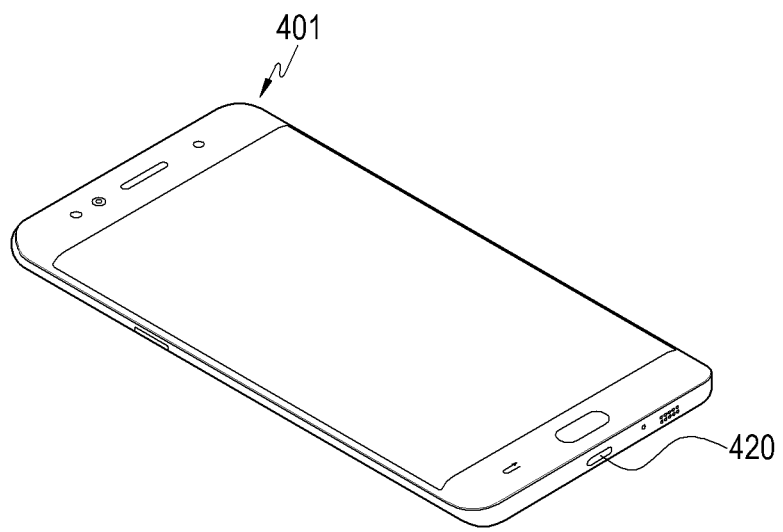
FIG. 4 is a perspective view of an electronic device as viewed from its outside, according to an embodiment of the present disclosure.

FIG. 4 is a perspective view of an electronic device as viewed from its outside, according to an embodiment of the present disclosure.

Referring to FIG. 4, the electronic device 401 may include an interface unit 420 on a surface of the housing to enable connection with a connector or adapter. A plurality of interface units 420 may be provided. The electronic device 401 may be connected with various external devices through an interface device connected with the interface unit 420 and provide expanded functionality through the connection with the external devices. The interface unit 420 may be a USB-type interface.

Figure 5:
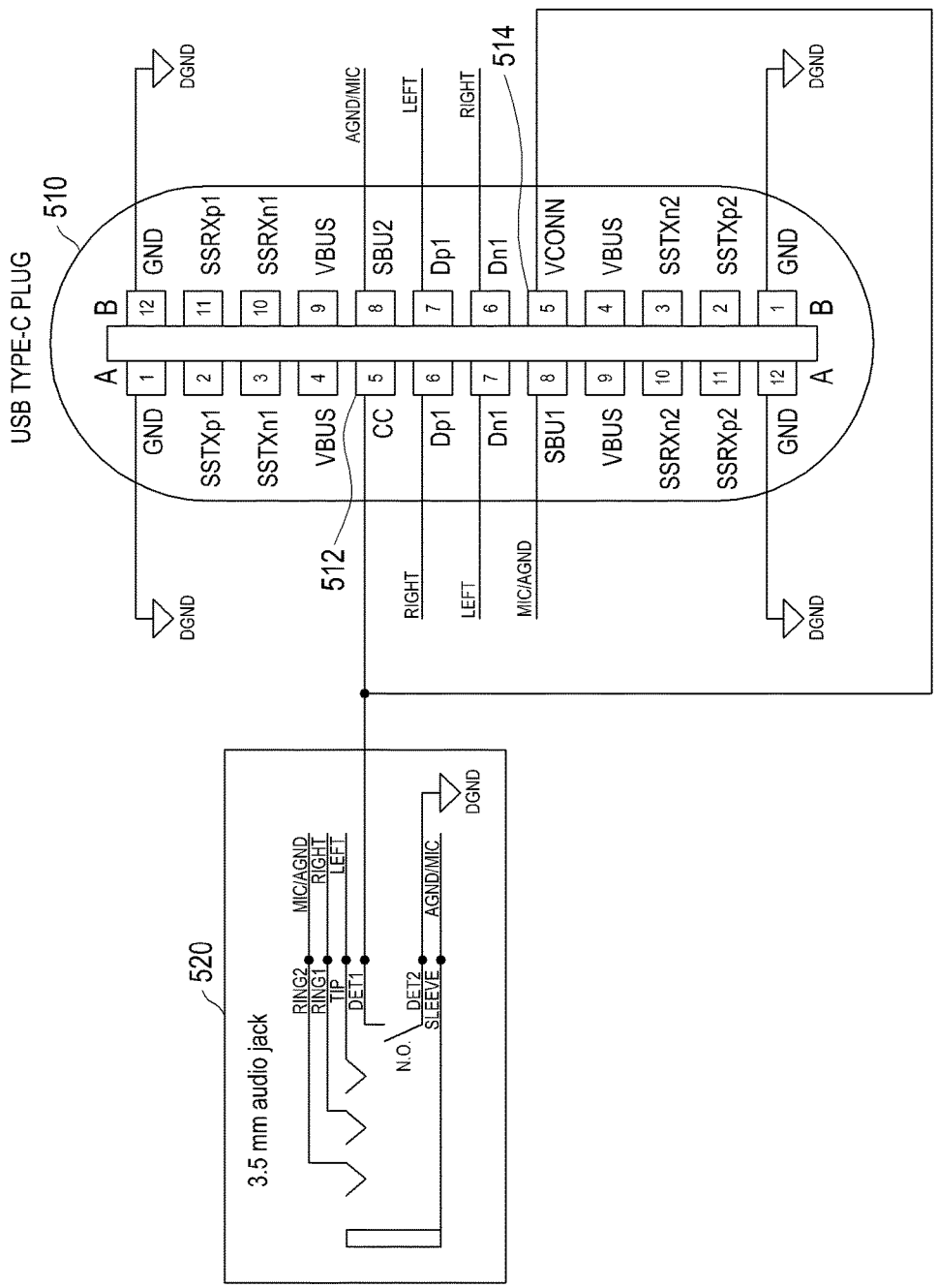
FIG. 5 is a USB type-C plug according to an embodiment of the present disclosure.

FIG. 5 is a view of a USB type-C plug, according to an embodiment of the present disclosure.

The USB type-C plug 510 includes 12 pins (terminals) on each of an A surface and a B surface. The 12 pins on the A surface may include a GND(A1), SSTXp1(A2), SSTXn1(A3), VBUS(A4), CC(A5), Dp1(A6), Dn1(A7), SBU1(A8), VBUS(A9), SSRXn2(A10), SSRXp2(A11), and GND(A12) pin. The 12 pins on the B surface may include a GND(B1), SSTXp2(B2), SSTXn2(B3), VBUS(B4), VCONN(B5), Dp1(B6), Dn1(B7), SBU2(B8), VBUS(B9), SSRXn1(B10), SSRXp1(B11), and GND(B12) pin.

The CC(A5), Dp1(A6), Dn1(A7), SBU1(A8), and GND (A1, A12) pins may be connected with the terminals of a 3.5 mm analog audio jack 520, or the VCONN(B5), Dp1(B6), Dn1(B7), SBU1(B8), and GND(B1, B12) pins on the B surface may be connected with the terminals of the 3.5 mm analog audio jack 520.

The CC(A5) pin 512 or the VCONN(B5) pin 514 may be connected with the DET1 terminal of the 3.5 mm analog audio jack 520. Any one of the Dp1 and Dn1(A6, B6) pins may be connected with the Ring 1 terminal of the 3.5 mm analog audio jack 520. The Ring 1 terminal, which is a terminal corresponding to the right speaker of the earphone 402, may be a terminal through which a right sound signal may be outputted from the electronic device 401. Any one of the Dn1 and Dp1(A7, B7) pins may be connected with the Tip terminal of the 3.5 mm analog audio jack 520. The Tip terminal, which is a terminal corresponding to the left speaker of the earphone 402, may be a terminal through which a left sound signal may be outputted from the electronic device 401. Any one of the SBU1 and SBU2(A8, B8) pins may be connected with the Ring 2 terminal or sleeve terminal of the 3.5 mm analog audio jack 520. The Ring 2 terminal and the sleeve terminal each may be a terminal corresponding to any one of the microphone and ground of the earphone 402. For example, where the Ring 2 terminal is a terminal corresponding to the microphone, the sleeve terminal may be a terminal corresponding to the ground, and where the Ring 2 terminal is a terminal corresponding to the ground, the sleeve terminal may be a terminal corresponding to the microphone. Where the terminal corresponds to the microphone, it may be a terminal for outputting a sound signal received from the microphone of the earphone 402.

Figure 6:
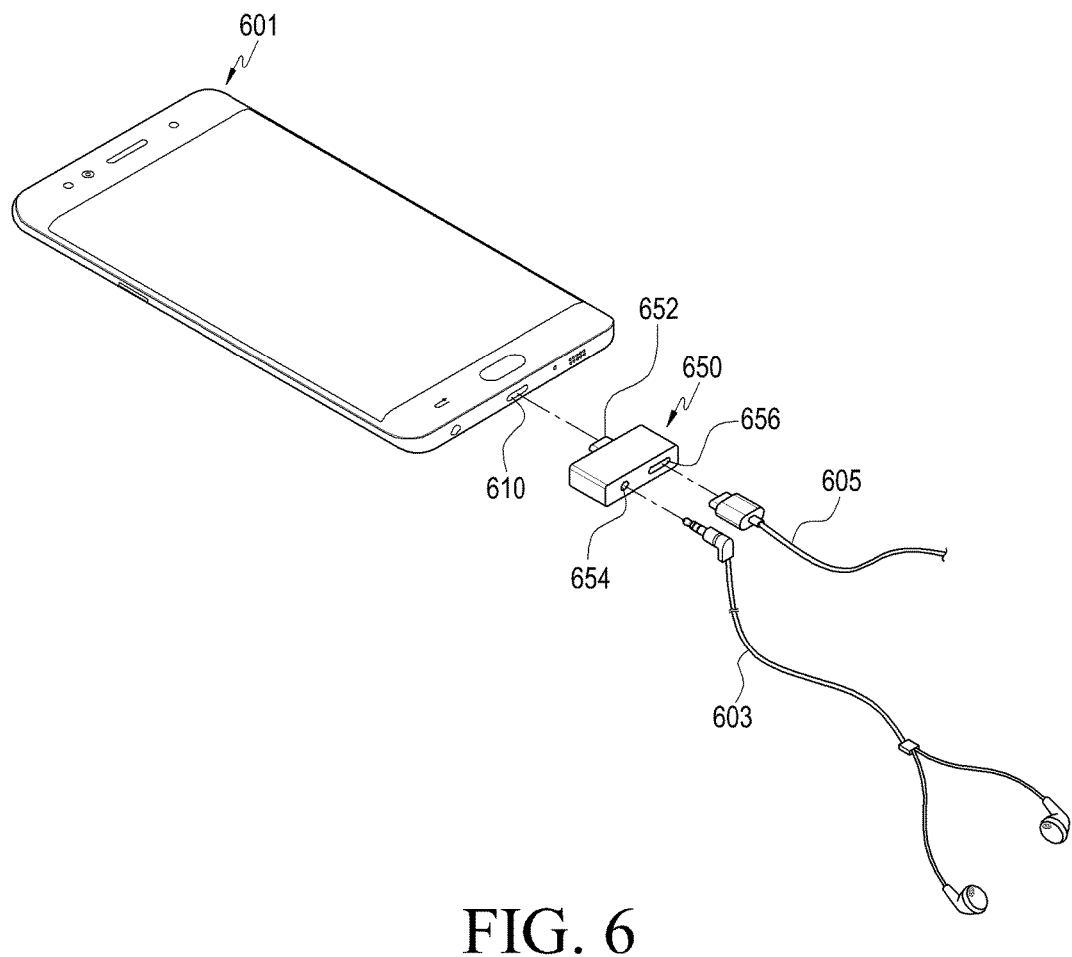
FIG. 6 is a schematic of an electronic device, an interface device, an audio device, and another electronic device, according to an embodiment of the present disclosure.

FIG. 6 is a schematic of an electronic device, an interface device, an audio device, and another electronic device, according to an embodiment of the present disclosure.

The electronic device 601 may include a first USB-type second receptacle 610 on a surface of its housing.

The interface device may be an adapter 650. The adapter 650 may include a first USB-type first plug 652 on a surface of its housing and an analog audio jack 654 and a first USB-type first receptacle 656 on another surface of its housing. The first USB-type first plug 652, the analog audio jack 654, and the first USB-type first receptacle 656 may be arranged on the same surface or different surfaces of the housing. The first USB-type first plug 652 and the first USB-type first receptacle 656, respectively, may be a USB type-C plug and a USB type-C receptacle. The first USB-type first plug 652 may be connected to the first USB-type second receptacle 610 of the electronic device 601. An analog audio plug of an audio device, such as the earphone 603, may be connected to the analog audio jack 654. A first type third plug for connection with another electronic device 605, such as a charger 605, may be connected to the first USB-type first receptacle 656.

Where the electronic device 601 includes the first USB-type second receptacle 610 but not an analog audio jack 654 as shown in FIG. 6, the use of the adapter 650 enables connection of both the audio device 603 and another electronic device, such as a charger 605, to the electronic device 601.

Figure 7:
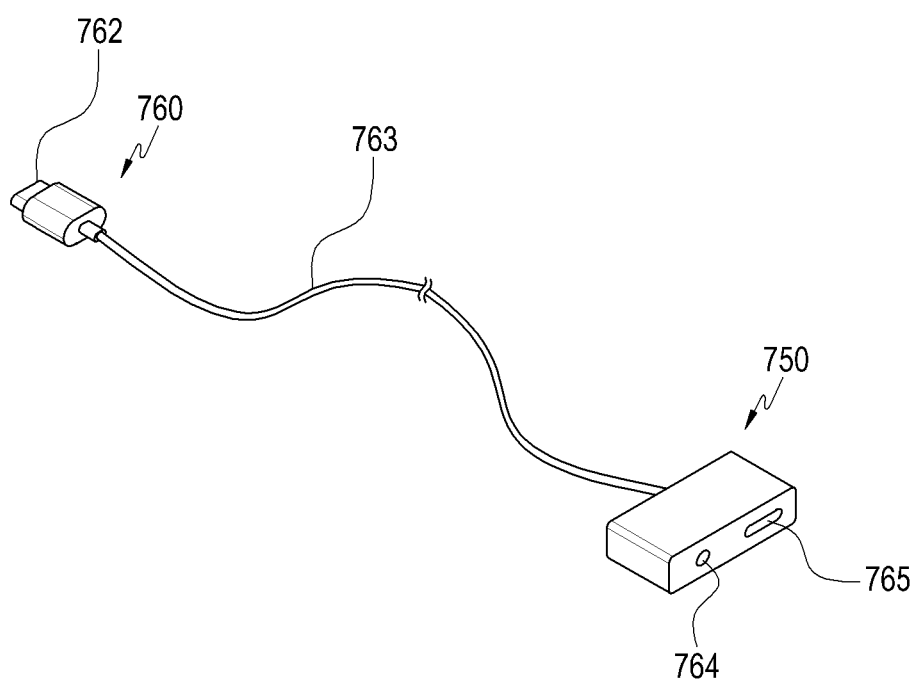
FIG. 7 is a perspective view of an interface device, according to an embodiment of the present disclosure.

FIG. 7 is a perspective view of an interface device, according to an embodiment of the present disclosure.

The interface device may be an adapter 760. The adapter 760 may include a first housing having a first USB-type first plug 762, a second housing having a first receptacle 764 and an analog audio jack 766 and a cable 763 connecting the first housing with the second housing. The first housing may be connected to an end of the cable 763, and the second housing may be connected to another end of the cable 763.

Figure 8:
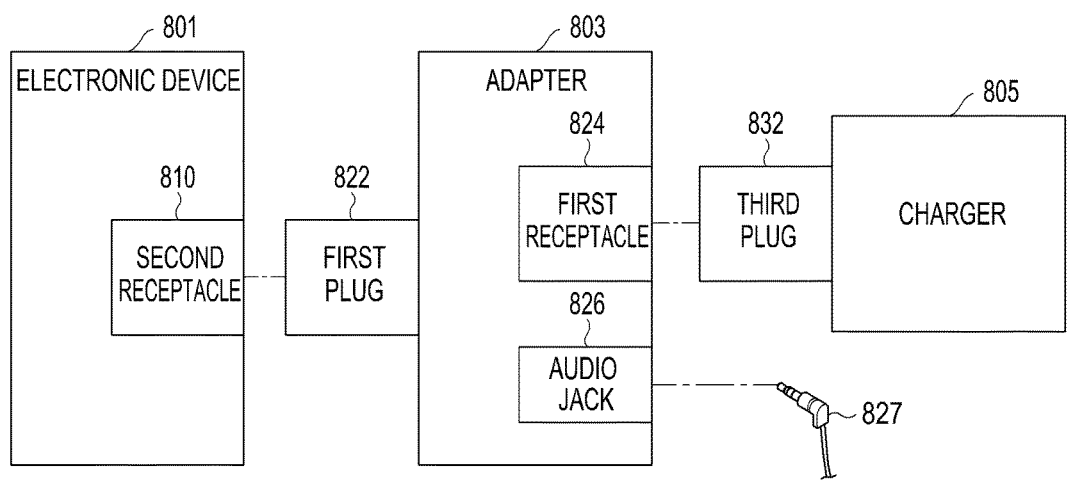
FIG. 8 is a block diagram of a configuration of an adapter simultaneously connecting an audio device and a charger to an electronic device, according to an embodiment of the present disclosure.

FIG. 8 is a block diagram illustrating a configuration of an adapter simultaneously connecting an audio device and a charger to an electronic device, according to an embodiment of the present disclosure.

The electronic device 801 may include a second receptacle 810. The second receptacle 810 may be a first USB-type second receptacle 810. The first USB-type second receptacle may be a USB type-C receptacle. A first plug 822 may be connected to the second receptacle 810. The first plug 822 may be a first USB-type first plug. The first USB-type first plug may be a USB type-C plug.

The adapter 803 may include the first plug 822, a first receptacle 824, and an audio jack 826. The first plug 822 and the first receptacle 824, respectively, may be a first USB-type first plug and a first USB-type first receptacle. The first plug 822 and the first receptacle 824, respectively, may be a USB type-C plug and a USB type-C receptacle. The first plug 822 may be connected to the second receptacle 810 of the electronic device 801. The first receptacle 824 may be connected to the third plug 832 of the charger 805. The first plug 822 may include a first CC(A5) pin, a first Dp1(A6) pin, a first Dn1(A7) pin, a first SBU1(A8) pin, and first GND(A1, A12) pins of an A surface connectable to the audio jack 826 and a first VCONN(B5) pin, a first Dp1(B6) pin, a first Dn1(B7) pin, a first SBU1(B8) pin, and first GND(B1, B12) pins of a B surface. The first receptacle 824 may include a second CC(A5) pin, a second Dp1(A6) pin, a second Dn1(A7) pin, a second SBU1(A8) pin, and second GND(A1, A12) pins of the A surface connectable to the audio jack 826 and a second VCONN(B5) pin, a second Dp1(B6) pin, a second Dn1(B7) pin, a second SBU1(B8) pin, and second GND(B1, B12) pins of the B surface. The audio jack 826 may be an analog audio jack that may be connected with an analog audio plug of an audio device, the earphone 827. The audio jack 826 may include a DET1 terminal, a Ring 1 terminal, a Tip terminal, and a Ring 2 terminal.

The charger 805 may include the third plug 832 as a first USB-type third plug, such as a USB type-C plug.

Figure 9:
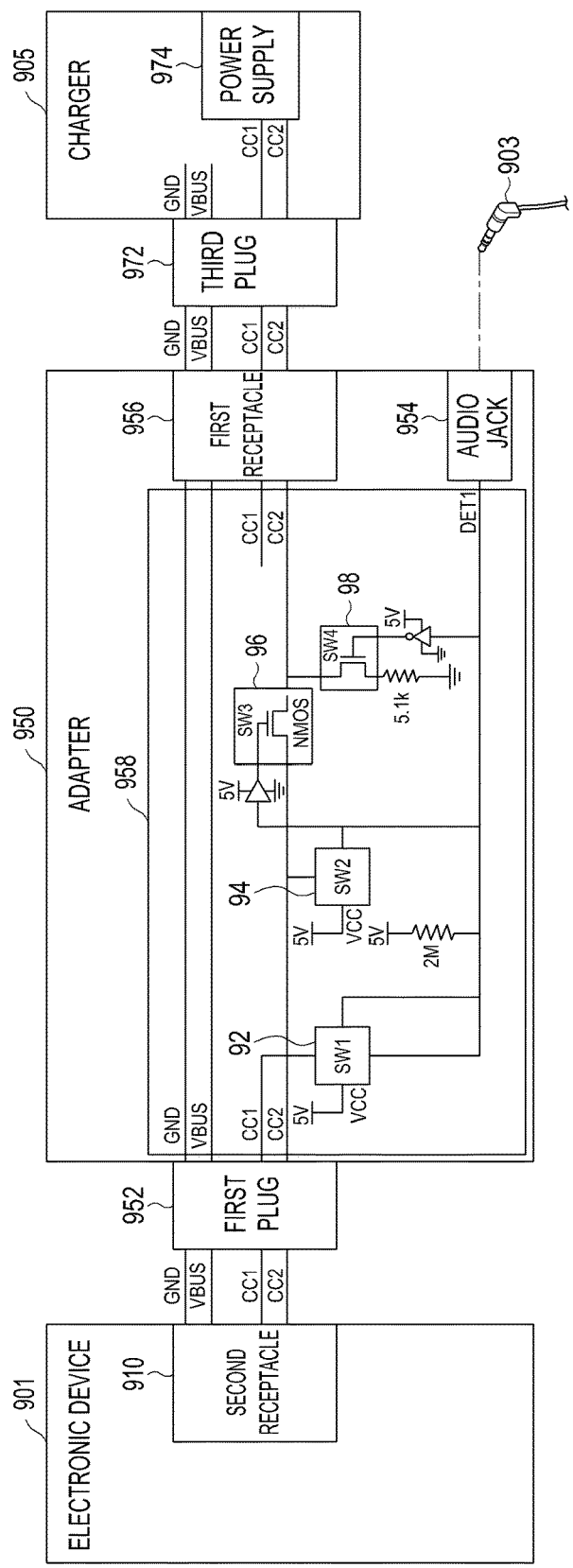
FIG. 9 is a view of a circuit of an adapter capable of simultaneously connecting an audio device and a charger to an electronic device and quick charging the electronic device, according to an embodiment of the present disclosure.

FIG. 9 is a view of a circuit of an adapter capable of simultaneously connecting an audio device and a charger to an electronic device and quick charging the electronic device, according to an embodiment of the present disclosure.

Referring to FIG. 9, an adapter 950 may include a connection circuit 958 capable of connecting both an audio device 903 and a charger 905 to an electronic device 901 and quickly charging the electronic device when the charger 905 is connected to the electronic device 901 and the audio device 903 is not connected with the electronic device 901.

The connection circuit 958 may connect a first plug 952 to a first receptacle 956, the first plug 952 to an audio jack 954, or the first plug 952 to both the first receptacle 956 and the audio jack 954. The connection circuit 958 may enable quick charging on the electronic device 901 when the charger 905 is connected to the electronic device 901 and the audio device 903 is not connected to the electronic device 901.

According to an embodiment of the present disclosure, the connection circuit 958 may include at least one or more switches. The at least one or more switches may include a first switch (SW1) 92, a second switch (SW2) 94, a third switch (SW3) 96, and a fourth switch (SW4) 98. The first switch 92 may be connected between the CC1 line connected with the CC(5) pin of the first plug 952 with the DET1 terminal of the audio jack 954, switching on or off. The second switch 94 may be connected between the CC2 line connected with the VCONN(9) pin of the first plug 952 with the DET1 terminal of the audio jack 954, switching on or off. The third switch 96 may be connected between the CC2 line connected with the VCONN(9) pin of the first plug 952 (or the CC1 line connected with the CC(5) pin) and the CC2 line connected with the VCONN(9) pin of the first receptacle 956 (or the CC1 line connected with the CC(5) pin), switching on or off. The fourth switch 98 may be connected between the CC2 line connected with the VCONN(9) pin of the first receptacle 956 (or the CC1 line connected with the CC(5) line) and a 5.1 Kohm pull-down resistor, switching on or off.

FIG. 10 is a table illustrating a switching operation of an adapter, according to an embodiment of the present disclosure.

Figure 11:
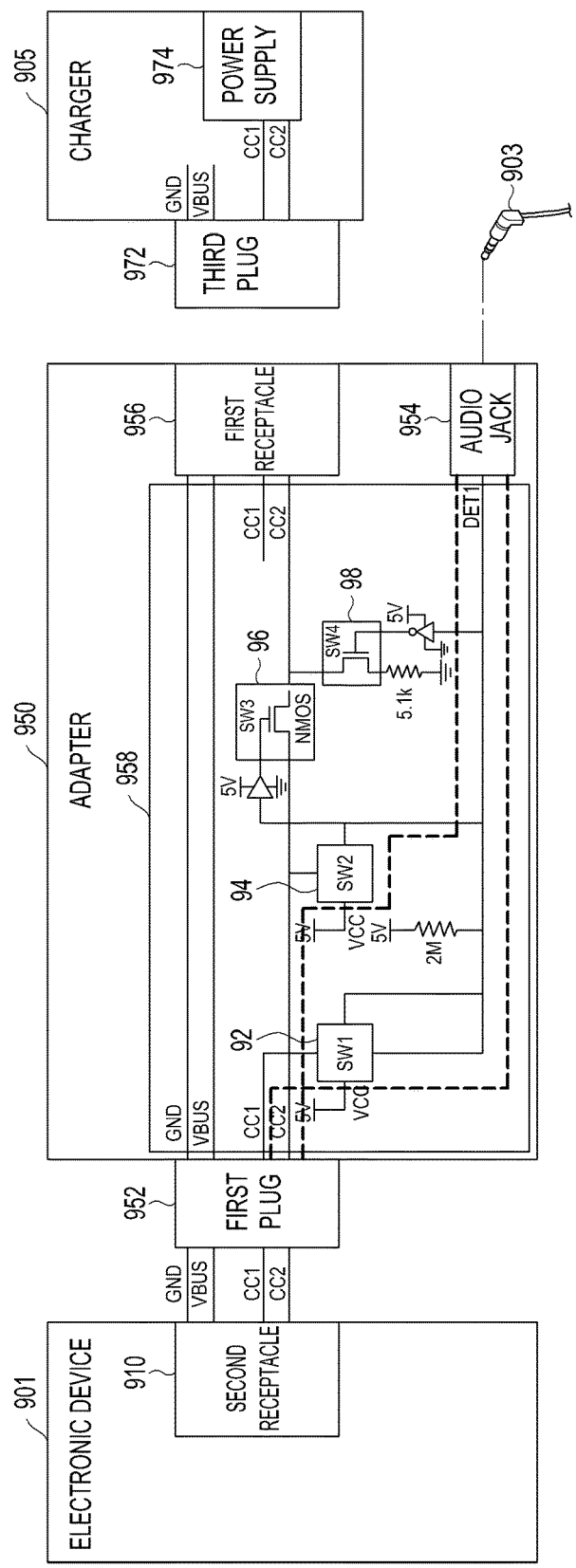
FIG. 11 is a view of an operation of a connection circuit when an audio device is connected to an adapter but is not charging while the adapter remains connected to an electronic device, according to an embodiment of the present disclosure.

Referring to FIG. 11, the electronic device 901 may be a phone, the audio device 903 may be a 3.5pi earphone, and the charger 905 may be a travel adapter (TA).

The adapter 950 may be in a first state in which the first receptacle 956 and the audio jack 954 make no connection while the phone is connected with the first plug 952, a second state in which the first receptacle 956 makes no connection and the audio jack 954 makes a connection while the phone is connected with the first plug 952, a third state in which the first receptacle 956 makes a connection and the audio jack 954 makes no connection while the phone is connected with the first plug 952, and a fourth state in which the first receptacle 956 makes a connection and the audio jack 954 makes no connection while the phone is connected with the first plug 952.

The first state may be a state in which the TA is not connected to the first receptacle 956 and a 3.5pi earphone is not connected to the audio jack 954 while the phone is connected with the first plug 952. The first state may be a state in which the CC1 line and CC2 line of the first receptacle 956 on the TA side are open, and the CC1 line and CC2 line of the first plug 952 on the phone side are open. In this case, the SW1 92, the SW2 94, the SW3 96, and the SW4 98 each may be open, so that the phone may not perform an operation with the 3.5pi earphone and the TA.

The second state may be a state in which the TA is not connected to the first receptacle 956 and the 3.5pi earphone is connected to the audio jack 954 while the phone is connected with the first plug 952. The second state may be a state in which the CC1 line and CC2 line of the first receptacle 956 on the TA side are open, and the CC1 line and CC2 line of the first plug 952 on the phone side are connected with the DET1 terminal of the audio jack 954. In this case, the SW1 92 and the SW2 94 may be switched on, and the SW3 96 and the SW4 98 may be switched off, so that the phone may communicate analog audio signals with the 3.5pi earphone.

The third state may be a state in which the TA is connected to the first receptacle 956 and the 3.5pi earphone is connected to the audio jack 954 while the phone is connected with the first plug 952. The third state may be a state in which any one of the CC1 line and CC2 line of the first receptacle 956 on the TA side may be connected to the 5.1 Kohm pull-down resistor, and the CC1 line and CC2 line of the first plug 952 on the phone side are connected with the DET1 terminal of the audio jack 954. In this case, the SW1 92, the SW2 94, and the SW4 98 may be switched on, so that the phone may communicate analog audio signals with the 3.5pi earphone and may be charged with default power by the TA. The default power may be a preset level of power to be provided from the TA. For example, the default power may be power set to provide a 5V voltage and a 500 mA current.

The fourth state may be a state in which the TA is connected to the first receptacle 956 and the 3.5pi earphone is not connected to the audio jack 954 while the phone is connected with the first plug 952. The fourth state may be a state in which the CC2 (or CC1) line of the first receptacle 956 on the TA side may be connected to the CC2 (or CC1) line of the first plug 952 on the phone side and the CC1 line and CC2 line of the first plug 952 on the phone side are not connected with the DET1 terminal of the audio jack 954. In this state, the SW3 96 may be switched on, so that the phone may perform CC communication with the TA and may be quickly charged with a higher level of power than the default power.

FIG. 11 is a view of an operation of a connection circuit when an audio device is connected to an adapter but is not charging while the adapter remains connected to an electronic device according to an embodiment of the present disclosure.

When the first receptacle 956 makes no connection and the audio device 903 is connected to the audio jack 954 while the first plug 952 of the adapter 950 is connected with the second receptacle 910 of the electronic device 901, the CC1 line and the CC2 line of the first receptacle 956 are open, so that the SW3 96 and the SW4 98 may be switched off, and the SW1 92 and the SW2 94 connected with the CC1 line and the CC2 line of the first plug 952 may be switched on. Accordingly, the CC1 line and the CC2 line of the first plug 952 may be connected with the DET1 terminal of the audio jack 954, and the electronic device 901 may recognize the connection of the audio device 903 to the audio jack 954 through the CC1 line and the CC2 line, communicating analog audio signals with the audio device 903.

Figure 12:
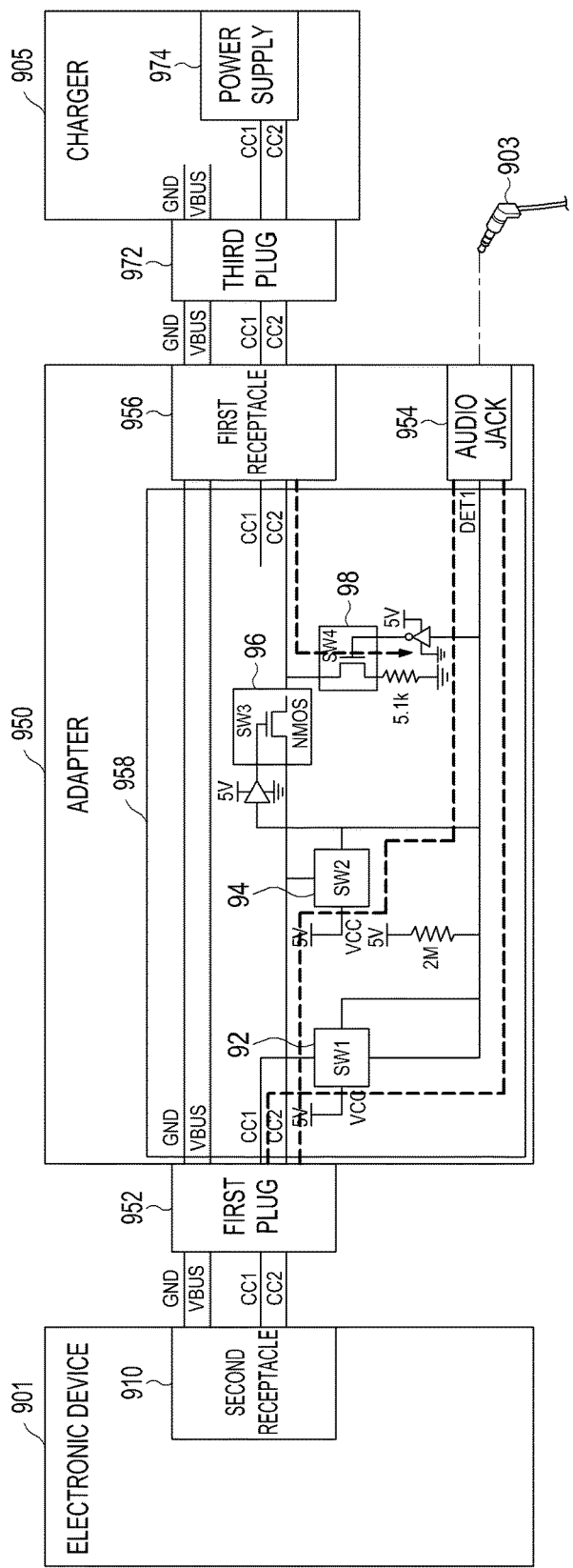
FIG. 12 is a view of an operation of a connection circuit when an audio device and a charger are both connected to an adapter while the adapter is connected to an electronic device, according to an embodiment of the present disclosure.

FIG. 12 is a view of an operation of a connection circuit when an audio device and a charger are both connected to an adapter while the adapter is connected to an electronic device, according to an embodiment of the present disclosure.

When the third plug 972 of the charger 905 is connected to the first receptacle 956 and the audio device 903 is connected to the audio jack 954 while the first plug 952 of the adapter 950 is connected with the second receptacle 910 of the electronic device 901, the SW4 98 connected with the CC2 line of the first receptacle 956 is switched on, so that the CC2 line (or CC1 line) may be connected to the 5.1 Kohm pull-down resistor, turning to a pull-down state. Further, the SW1 92 and the SW2 94 connected with the CC1 line and the CC2 line of the first plug 952 may also be switched on so that the CC1 line and CC2 line of the first plug 952 may be connected to the DET1 terminal of the audio jack 954.

As the SW4 98 is switched on, the CC2(or CC1) line on the first receptacle 956 side may be connected to the 5.1 Kohm resistor, turning to the pull-down state. Then, the charger 905 may recognize the 5.1 Kohm resistance, providing the default power through the VBUS line in the charger 905. The default power provided by the charger 905 may be delivered to the electronic device 901 through the adapter 950. The default power may be a preset level of power to be provided from the charger 905. For example, the default power may be power set to provide a 5V voltage and a 500 mA current.

When the CC1 line and the CC2 line of the first plug 952 are connected to the DET1 terminal of the audio jack 954 as the SW1 92 and the SW2 94 are switched on, the electronic device 901 may recognize the connection of the audio device 903 to the audio jack 954 through the CC1 line and the CC2 line, communicating analog audio signals with the audio device 903.

When the SW1 92, the SW2 94, and the SW4 98 are switched on, the electronic device 901 may receive, and be charged with, default power from the charger 905 while communicating analog audio signals with the audio device 903.

Figure 13:
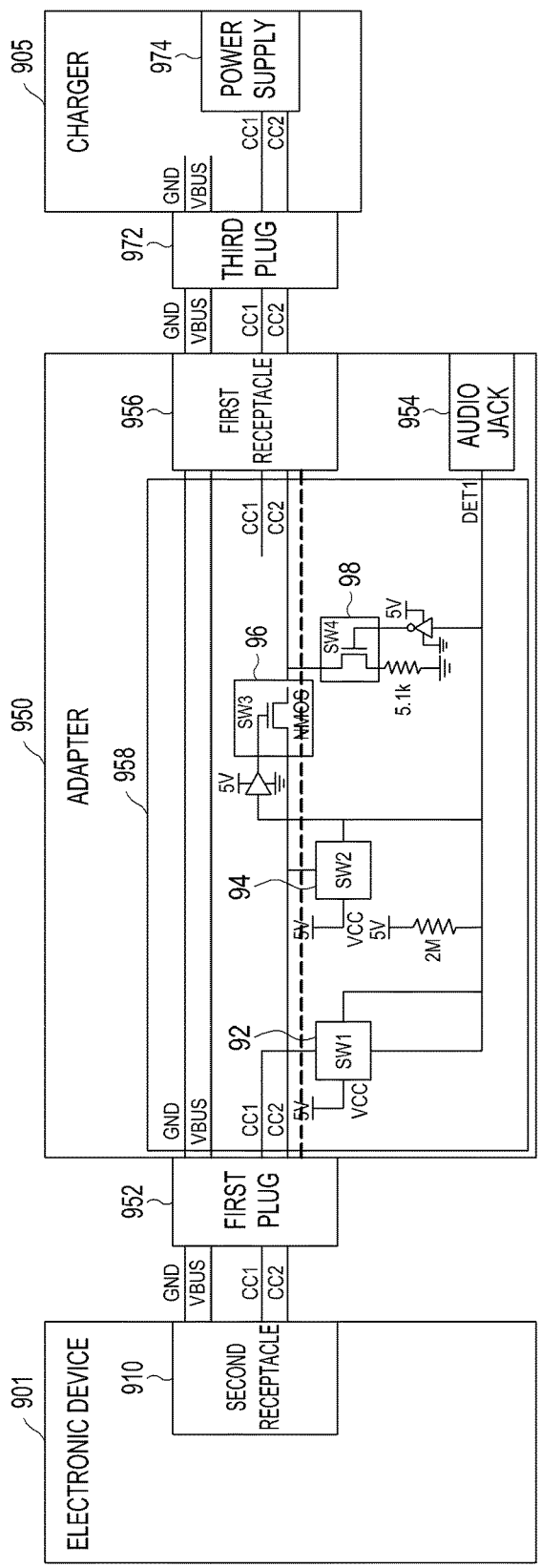
FIG. 13 is a view of an operation of a connection circuit when a charger is connected to an adapter but an audio device is not connected to the adapter while the adapter is connected to an electronic device, according to an embodiment of the present disclosure.

FIG. 13 is a view of an operation of a connection circuit when a charger is connected to an adapter but an audio device is not connected to the adapter while the adapter is connected to an electronic device, according to an embodiment of the present disclosure.

When the third plug 972 of the charger 905 is connected to the first receptacle 956 and the audio jack 954 makes no connection while the first plug 952 of the adapter 950 is connected with the second receptacle 910 of the electronic device 901, the DET1 terminal of the audio jack 954 is open, so that the SW1 92 and the SW2 94 may be switched off, and the SW3 96 connected with the CC2 line of the first receptacle 956 may be switched on, enabling the CC2 line to connect to the CC2 line of the first plug 952. Thus, the electronic device 901 may perform CC communication with the charger 905 through the CC2 line. The electronic device 901 may identify the power, which may be supplied by the charger 905, through the CC communication. The charger 905 may provide various magnitudes of power to the electronic device 901. For example, the charger 905 may deliver a higher level of power (e.g., 5V-1.5 A power) than the default power (e.g., 5V-500 mA power or 5V-900 mA power) to the electronic device 901, or may deliver 5V-3 A power to the electronic device 901. The electronic device 901 may identify whether the charger 905 may provide a higher level of power than the default power through the CC communication. Where the charger 905 may provide a higher level of power than the default power, the electronic device 901 may send a request for the higher level of power to the charger 905. The electronic device 901 and the charger 905 may choose the default power or the higher level of power as the charging power through the CC communication.

According to an embodiment of the present disclosure, the adapter 950 may be included in various types of electronic devices, such as chargers or battery devices.

Figure 14:
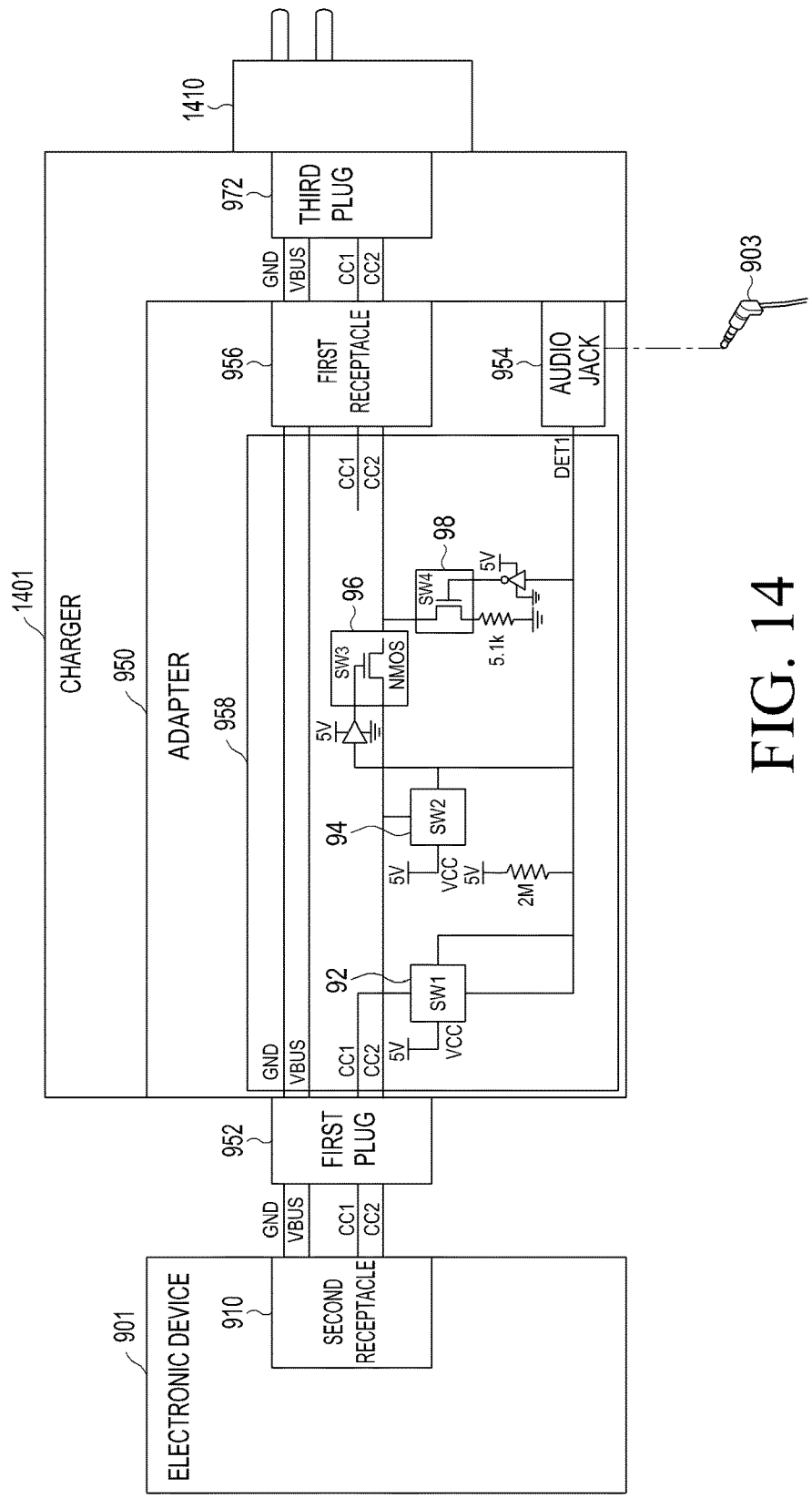
FIG. 14 is a view of an adapter included in a charger, according to an embodiment of the present disclosure.

FIG. 14 is a view of an adapter included in a charger according to an embodiment of the present disclosure.

The charger 1401 may include an adapter 950, a third plug 972, and a power plug 1410. The operation of the adapter 950 and the third plug 972 may be the same as the operation described above in connection with FIGS. 9 to 13. The power plug 1410 may be connected to an external power source and deliver power from the external power source to the third plug 972.

Figure 15:
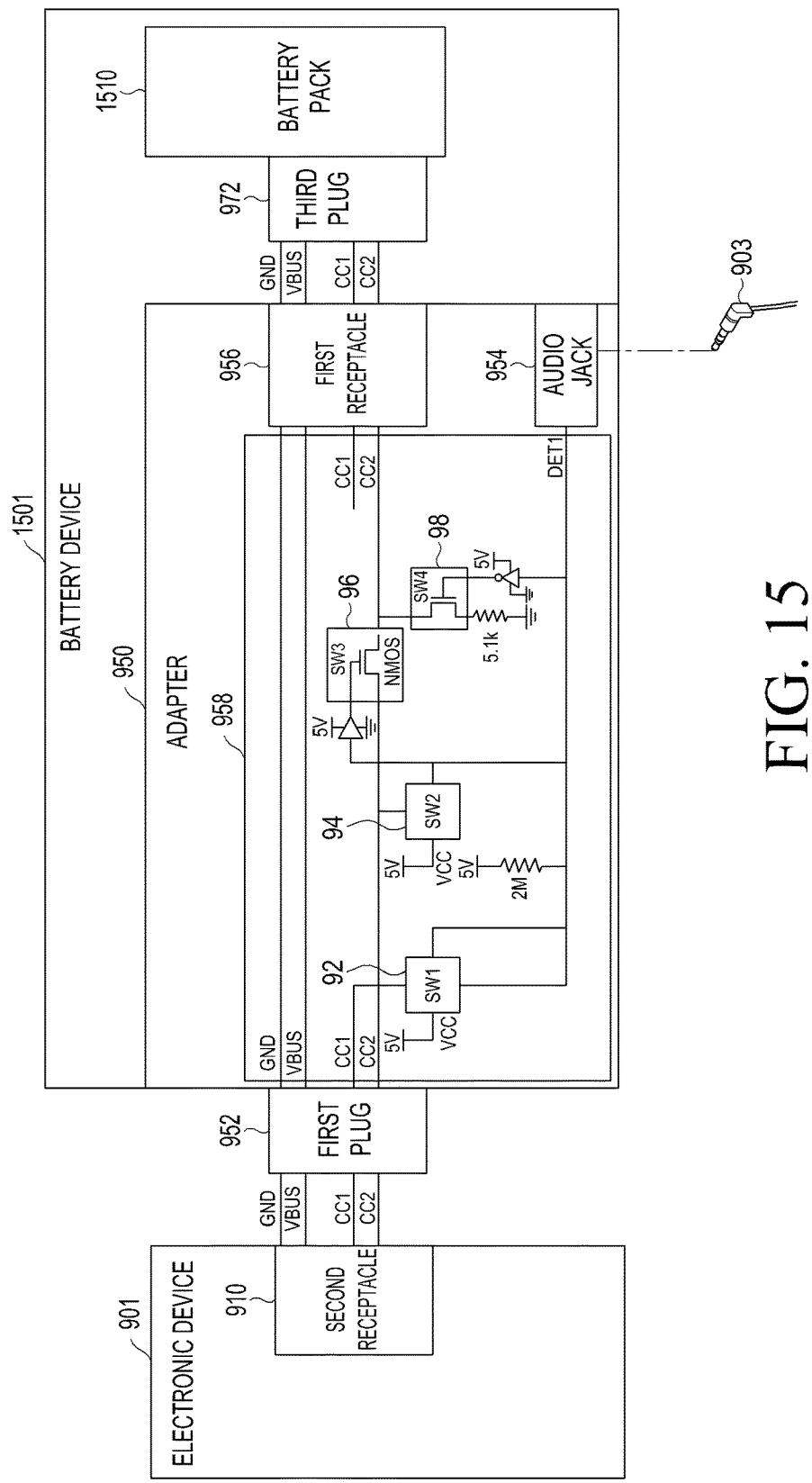
FIG. 15 is a view of an adapter included in a battery device, according to an embodiment of the present disclosure.

FIG. 15 is a view of an adapter included in a battery device according to an embodiment of the present disclosure.

The battery device 1501 may include an adapter 950, a third plug 972, and a battery pack 1510. The operation of the adapter 950 and the third plug 972 may be the same as the operation described above in connection with FIGS. 9 to 13. The battery pack 1510 may provide power to the third plug 972.

Each of the aforementioned components of the electronic device may include one or more parts, and a name of the part may vary with a type of the electronic device. The electronic device in accordance with embodiments of the present disclosure may include at least one of the aforementioned components, omit some of them, or include other additional component(s). Some of the components may be combined into an entity, but the entity may perform the same functions as the components.

The term "module" may refer to a unit including one of hardware, software, and firmware, or a combination thereof. The term "module" may be interchangeably used with a unit, logic, logical block, component, or circuit. The module may be a minimum unit or part of an integrated component and perform one or more functions. The module may be implemented mechanically or electronically. For example, the module may include at least one of application specific integrated circuit (ASIC) chips, field programmable gate arrays (FPGAs), or programmable logic arrays (PLAs) that perform some operations, which have already been known or will be developed in the future.

At least a part of the device (e.g., modules or their functions) or method (e.g., operations) may be implemented as instructions stored in a computer-readable storage medium in the form of a programming module. The instructions, when executed by the processor 120 may enable the processor 120 to carry out a corresponding function. The computer-readable storage medium may be the memory 130.

The computer-readable storage medium may include a hardware device, such as hard discs, floppy discs, magnetic tapes, magnetic disks. Additionally, the computer-readable storage medium may include optical media such as compact disc ROMs (CD-ROMs) and digital versatile discs (DVDs). Moreover, the computer-readable storage medium may also include magneto-optical media such as floptical disks, ROMs, RAMs, flash memories, and/or the like. Examples of the program commands may include not only machine language codes but also high-level language codes which are executable by various computing means using an interpreter. The aforementioned hardware devices may be configured to operate as one or more software modules to carry out exemplary embodiments of the present disclosure, and vice versa.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or be omitted, or be included with other additional operation(s).

As is apparent from the foregoing description, according to embodiments of the present disclosure, the interface device enables an electronic device with a single USB type-C connector but no 3.5pi analog audio jack to connect to both an audio device and a charger through the USB type-C connector, thus allowing the user to charge the electronic device while listening to music.

According to various embodiments of the present disclosure, the interface device may provide automated quick charging when connected with the charger but not with the audio device, allowing for enhanced convenience for the user.

It is apparent to one of ordinary skill in the art that the interface devices according to embodiments of the present disclosure as described above are not limited to the above-described embodiments and those shown in the drawings, and various changes, modifications, or alterations may be made thereto without departing from the scope of the present disclosure.

What is claimed is:

1. An interface device, comprising:
   a first plug of a first universal serial bus (USB) type;
   a first receptacle of the first USB type;
   an analog audio jack; and
   a connection circuit configured to connect the first plug to at least one of the first receptacle and the analog audio jack, to supply a first power level at a first charging current from a power supply to an electronic device when the power supply is connected to the first receptacle while a plug of an audio device is connected to the analog audio jack and the first plug is connected with the electronic device, and to supply a second power level at a second charging current from the power supply to the electronic device when the power supply is connected to the first receptacle while no plug is connected to the analog audio jack and the first plug is connected with the electronic device,
   wherein the first power level is less than the second power level and the first charging current is less than the second charging current wherein the first USB type is a USB type-C, and wherein the first plug of the USB type-C includes a first CC pin and a first VCONN pin, the first receptacle of the USB type-C includes a second CC pin and a second VCONN pin, and wherein the second charging current is for quick charging, wherein the analog audio jack includes a DET1 terminal, and wherein the connection circuit includes at least one or more switches for connecting the first CC pin and the first VCONN pin to the DET1 terminal, connecting any one of the second CC pin and the second VCONN pin to a pull-down resistor while connecting the first CC pin and the first VCONN pin to the DET1 terminal, or connecting the first VCONN pin to the second VCONN pin, wherein the at least one or more switches include a first switch connected between a CC1 line connected with the first CC pin of the first plug and the DET1 terminal of the analog audio jack to switch on or off, a second switch connected between a CC2 line connected with the first VCONN pin of the first plug and the DET1 terminal of the analog audio jack to switch on or off, a third switch connected between the CC2 line connected with the first VCONN pin of the first plug and the CC2 line connected with the second VCONN pin or between the CC1 line connected with the first CC pin of the first plug and the CC1 line connected with the second CC pin of the first receptacle to switch on or off, and a fourth switch connected between the CC2 line connected with the second VCONN pin of the first receptacle and the pull-down resistor or between the CC1 line connected with the second CC pin of the first receptacle and the pull-down resistor to switch on or off.

2. The interface device of claim 1, wherein when the first plug is connected to a first electronic device, the first receptacle is in a non-connected state, and the audio device is connected to the analog audio jack, the third switch and the fourth switch are switched off, and the first switch and the second switch are switched on to electrically connect the first electronic device to the analog audio jack.

3. The interface device of claim 1, wherein when the first plug is connected to a first electronic device, a charger is connected to the first receptacle, and the audio device is connected to the analog audio jack, the third switch and the fourth switch are switched off, and the first switch and the second switch are switched on to electrically connect the first electronic device to the analog audio jack and to electrically connect the first electronic device to the charger.

4. The interface device of claim 1, wherein when the first plug is connected to a first electronic device, a charger is connected to the first receptacle, and the analog audio jack is in a non-connected state, the third switch is switched on, and the first switch, the second switch, and the fourth switch are switched off to electrically connect the first electronic device to the charger.

5. The interface device of claim 1, further comprising:
- a first housing including the first plug of the first USB type;
- a second housing including the first receptacle of the first USB type and the analog audio jack; and
- a cable connecting the first housing with the second housing.

6. The interface device of claim 1, further comprising:
- a second plug of the first USB type connected with the first receptacle; and
- a power plug connected with the second plug configured to, when connected to an external power source, deliver power from the external power source to the second plug.

7. The interface device of claim 1, further comprising:
- a second plug of the first USB type connected with the first receptacle; and
- a battery pack connected with the second plug configured to provide power to the second plug.

* * * * *